(12) United States Patent
Sato et al.

(10) Patent No.: US 10,457,297 B2
(45) Date of Patent: Oct. 29, 2019

(54) RAILCAR

(71) Applicant: NIPPON SHARYO, LTD., Nagoya-shi, Aichi (JP)

(72) Inventors: Tetsuro Sato, Toyokawa (JP); Kentaro Hayashi, Toyohashi (JP); Naoshige Matsuo, Toyokawa (JP)

(73) Assignee: NIPPON SHARYO, LTD., Nagoya-shi (JP)

( * ) Notice: Subject to any disclaimer, the term of this patent is extended or adjusted under 35 U.S.C. 154(b) by 209 days.

(21) Appl. No.: 15/526,907

(22) PCT Filed: Aug. 31, 2015

(86) PCT No.: PCT/JP2015/074788
§ 371 (c)(1),
(2) Date: May 15, 2017

(87) PCT Pub. No.: WO2017/037852
PCT Pub. Date: Mar. 9, 2017

(65) Prior Publication Data
US 2017/0334465 A1    Nov. 23, 2017

(51) Int. Cl.
*B61F 1/12*     (2006.01)
*B61D 15/06*    (2006.01)
(Continued)

(52) U.S. Cl.
CPC .............. *B61F 1/12* (2013.01); *B61D 1/06* (2013.01); *B61D 15/06* (2013.01); *B61D 17/04* (2013.01);
(Continued)

(58) Field of Classification Search
CPC ...... B61F 1/00; B61F 1/08; B61F 1/10; B61F 1/14
See application file for complete search history.

(56) References Cited

U.S. PATENT DOCUMENTS 1,999,652 A    4/1935  Campbell
5,765,485 A    6/1998  Thoman et al.
(Continued)

FOREIGN PATENT DOCUMENTS

| JP | 2008-62817 A | 3/2008 | |
| JP | 2012-243390 | * 5/2014 | ................ B61F 1/10 |
| WO | 2014/068885 A1 | 5/2014 | |

OTHER PUBLICATIONS

Nov. 17, 2015 International Search Report issued in International Patent Application No. PCT/JP2015/074788.
(Continued)

*Primary Examiner* — Robert J McCarry, Jr.
(74) *Attorney, Agent, or Firm* — Oliff PLC

(57) ABSTRACT

A railcar that allows a first end beam to move toward a second end beam when an intended load is input is provided. A railcar includes a fuse member that couples a first end beam to a second end beam along a car longitudinal direction, and the fuse member buckles when a load received in collision exceeds a predetermined value to allow the first end beam to move toward the second end beam, thus ensuring reduction of variation of the load that allows the first end beam to move toward the second end beam. Consequently, when the intended load is input, the first end beam is allowed to move toward the second end beam.

14 Claims, 13 Drawing Sheets

(51) Int. Cl.
  *B61F 1/10* (2006.01)
  *B61G 11/16* (2006.01)
  *B61D 17/04* (2006.01)
  *B61D 1/06* (2006.01)

(52) U.S. Cl.
  CPC .............. *B61D 17/045* (2013.01); *B61F 1/10* (2013.01); *B61G 11/16* (2013.01); *Y02T 30/34* (2013.01)

(56) References Cited

U.S. PATENT DOCUMENTS

| | | |
|---|---|---|
| 6,000,342 A | 12/1999 | Thoman et al. |
| 2013/0220169 A1 | 8/2013 | Taguchi et al. |
| 2017/0327133 A1 | 11/2017 | Sato et al. |
| 2017/0327134 A1 | 11/2017 | Sato et al. |
| 2017/0334465 A1 | 11/2017 | Sato et al. |
| 2018/0037238 A1 | 2/2018 | Hirashima et al. |

OTHER PUBLICATIONS

Dec. 31, 2018 Office Action issued in U.S. Appl. No. 15/526,874.
Jun. 20, 2019 Office Action issued in U.S. Appl. No. 15/526,836.

\* cited by examiner

RAILCAR

TECHNICAL FIELD

The present invention relates to a railcar, and especially, relates to a railcar that allows movement toward a second end beam, of a first end beam when an intended load is input.

BACKGROUND ART

A technique that protects a passenger room when high external force acts on an end bodyshell by collision is disclosed. For example, Patent Literature 1 discloses a technique that disposes a first end beam and a second end beam at an end portion in a longitudinal direction of an underframe to dispose an energy absorber and a sliding center sill between these first end beam and second end beam.

The sliding center sill includes a square-tubular-shaped first beam member fastened to the first end beam, and a square-tubular-shaped second beam member fastened to the second end beam. An end portion of this first beam member and an end portion of this second beam member are opposed one another and fitted to one another. At this fit portion, a plurality of mutually communicating holes are drilled. A plurality of coupling members (rivets and bolts) inserted into these plurality of holes combine the first beam member with the second beam member.

According to Patent Literature 1, when the first beam member collides with an oncoming car, the first beam member and the second beam member are displaced mutually in opposite directions to transmit a load to the coupling members. When the load equal to or more than a predetermined amount is transmitted to the coupling members, the coupling members are broken to allow the first end beam to move toward the second end beam. Thus, energy transmitted from the first end beam to the second end beam is absorbed by an energy absorbing member.

CITATION LIST

Patent Literature

Patent Literature 1: WO 2014/068885 (for example, paragraphs 0012 and 0015, FIG. 3, and FIG. 4)

SUMMARY OF INVENTION

Technical Problem

However, in the above-described conventional technique, the plurality of holes are drilled in the fit portion of the first beam member and the second beam member, each of the coupling members is inserted into each of these plurality of holes, and the first beam member and the second beam member are mutually displaced in the opposite directions in consequence of the collision, thus having a structure that breaks each of the plurality of coupling members. Accordingly, due to a dimensional tolerance and a positional tolerance of each of the holes and the coupling members, the coupling members are broken to facilitate generation of variation at the load that allows the first end beam to move toward the second end beam.

Therefore, there has been a problem that, when the intended load is input, it is difficult to allow the first end beam to move toward the second end beam.

The present invention has been made to solve the above-described problem, and it is an object of the present invention to provide a railcar that allows movement toward a second end beam, of a first end beam, when an intended load is input.

Solution to Problem

A railcar according to a first aspect includes: an underframe that includes a first end beam disposed at an end portion in a car longitudinal direction and disposed to extend along a car width direction and a second end beam disposed separated from the first end beam to a car inner side and disposed to extend along the car width direction; an energy absorbing member that is arranged between the first end beam and the second end beam and absorbs an energy input from the first end beam and transmitted to the second end beam in collision; a protruding member disposed to protrude along the car longitudinal direction from the first end beam toward the second end beam; a slide holding portion that slidably holds the protruding member along the car longitudinal direction and is formed at the second end beam; and a fuse member that couples the first end beam to the second end beam along the car longitudinal direction and buckles to allow the first end beam to move toward the second end beam when a load received in the collision exceeds a predetermined value.

The railcar according to a second aspect is the railcar according to the first aspect, and the underframe includes a center sill coupled to a surface at the car inner side at approximately a center in the car width direction of the second end beam to be disposed to extend along the car longitudinal direction, and the energy absorbing member has a predetermined distance from the first end beam to be coupled to a surface at a car outer side at the center in the car width direction of the second end beam.

The railcar according to a third aspect in the railcar according to the second aspect, includes a pair of sets including the protruding member and the slide holding portion, and the pair of sets are symmetrically disposed in the car width direction across the energy absorbing member.

The railcar according to a fourth aspect in the railcar according to the third aspect, includes a pair of the fuse members, and the pair of fuse members are symmetrically disposed in the car width direction across the energy absorbing member.

The railcar according to a fifth aspect is the railcar according to the fourth aspect, and the set of the protruding member and the slide holding portion is disposed outside the fuse member in the car width direction.

The railcar according to the sixth aspect in the railcar according to the fourth or fifth aspects, includes a pair of end posts disposed upright from the first end beam to be coupled to a roof bodyshell, and each of the pair of fuse members is disposed at a position where at least a part of a position in the car width direction of each of the pair of fuse members overlaps each of the pair of end posts.

The railcar according to a seventh aspect is the railcar according to any of the first to sixth aspects, and the slide holding portion is penetrated through the second end beam along the car longitudinal direction to be formed as an opening into which the protruding member is inserted.

Advantageous Effects of Invention

The railcar according to the first aspect includes the fuse member that couples the first end beam to the second end beam along the car longitudinal direction, and the fuse member buckles when the load received in the collision exceeds the predetermined value to allow the first end beam to move toward the second end beam, thus ensuring reduction of variation of the load that allows the first end beam to move toward the second end beam. Consequently, when an intended load is input, the first end beam is allowed to move toward the second end beam.

Further, including the protruding member disposed to protrude along the car longitudinal direction from the first end beam toward the second end beam and the slide holding portion that slidably holds this protruding member along the car longitudinal direction and is formed at the second end beam ensures guiding the movement of the first end beam along the car longitudinal direction when this first end beam is moved toward the second end beam.

According to the railcar according to the second aspect, in addition to the effect that the railcar according to the first aspect provides, the underframe includes the center sill coupled to the surface at the car inner side at approximately the center in the car width direction of the second end beam to be disposed to extend along the car longitudinal direction, and the energy absorbing member is coupled to the surface at the car outer side at the center in the car width direction of the second end beam. Accordingly, when the first end beam is moved toward the second end beam to compress the energy absorbing member, the center sill supports the second end beam to ensure assured deformation of the energy absorbing member and restraining the second end beam from deforming inward the car to influence the passenger room.

The energy absorbing member has the predetermined distance from the first end beam, thus facilitating to transmit the load input to the first end beam, only to the fuse member for this distance to ensure restraining the energy absorbing member from becoming a resistance against the buckling of the fuse member.

The railcar according to the third aspect, in addition to the effect that the railcar according to the second aspect provides, includes the pair of sets including the protruding member and the slide holding portion, and the pair of sets are symmetrically disposed in the car width direction across the energy absorbing member. Thus, for example, even when an unbalanced load is input, this ensures straight guiding (moving along the car longitudinal direction) the first end beam toward the second end beam. Consequently, the fuse member can be buckled by the intended load, and the energy absorbing member can be stably compressed along the car longitudinal direction.

The railcar according to the fourth aspect, in addition to the effect that the railcar according to the third aspect provides, includes the pair of the fuse members, and the pair of fuse members are symmetrically disposed in the car width direction across the energy absorbing member. Thus, this ensures uniforming the load required for the deformation in the buckling and after the buckling of the fuse member, in the car width direction. Consequently, slide displacement of the protruding member with respect to the slide holding portion can be smoothly performed.

According to the railcar according to the fifth aspect, in addition to the effect that the railcar according to the fourth aspect provides, the set of the protruding member and the slide holding portion is disposed at the outer side in the car width direction of the fuse member. Thus, this facilitates straight guiding (moving along the car longitudinal direction) the first end beam toward the second end beam, with respect to the input of the unbalanced load. Consequently, this facilitates the buckling of the fuse member with the intended load and facilitates the stable compression of the energy absorbing member along the car longitudinal direction.

The railcar according to the sixth aspect, in addition to the effect that the railcar according to the fourth or fifth aspects provides, includes a pair of end posts disposed upright from the first end beam to be coupled to the roof bodyshell, and each of the pair of fuse members is disposed at a position where at least a part of a position in the car width direction of each of the pair of fuse members overlaps each of the pair of end posts. Thus, when an oncoming car collides with an end bodyshell, this facilitates to transmit the load in the collision to the fuse member via the end posts.

According to the railcar according to the seventh aspect, in addition to the effect that the railcar according to any one of the first to sixth aspects provides, the slide holding portion is penetrated through the second end beam along the car longitudinal direction to be formed as an opening into which the protruding member is inserted. Thus, when the first end beam is moved toward the second end beam, using a space at a back side (inward the car) of the second end beam ensures receiving the protruding member. That is, the effect guiding the first end beam along the car longitudinal direction (the slide displacement of the protruding member with respect to the slide holding portion) can be maintained until just before the first end beam abuts on the second end beam.

Disposing the opening as the slide holding portion at the second end beam ensures rigidity of this slide holding portion. Accordingly, the slide holding portion can strongly hold the protruding member to ensure coupling strength between the first end beam and the second end beam to that extent, thus ensuring improvement of rigidity of a car end portion (an end portion in the car longitudinal direction).

DESCRIPTION OF EMBODIMENTS

Hereinafter, a description will be given of a preferred embodiment of the present invention with reference to the accompanying drawings. First, an overall configuration of a railcar 1 will be described with reference to FIG. 1 to FIG. 4.

Figure 1:
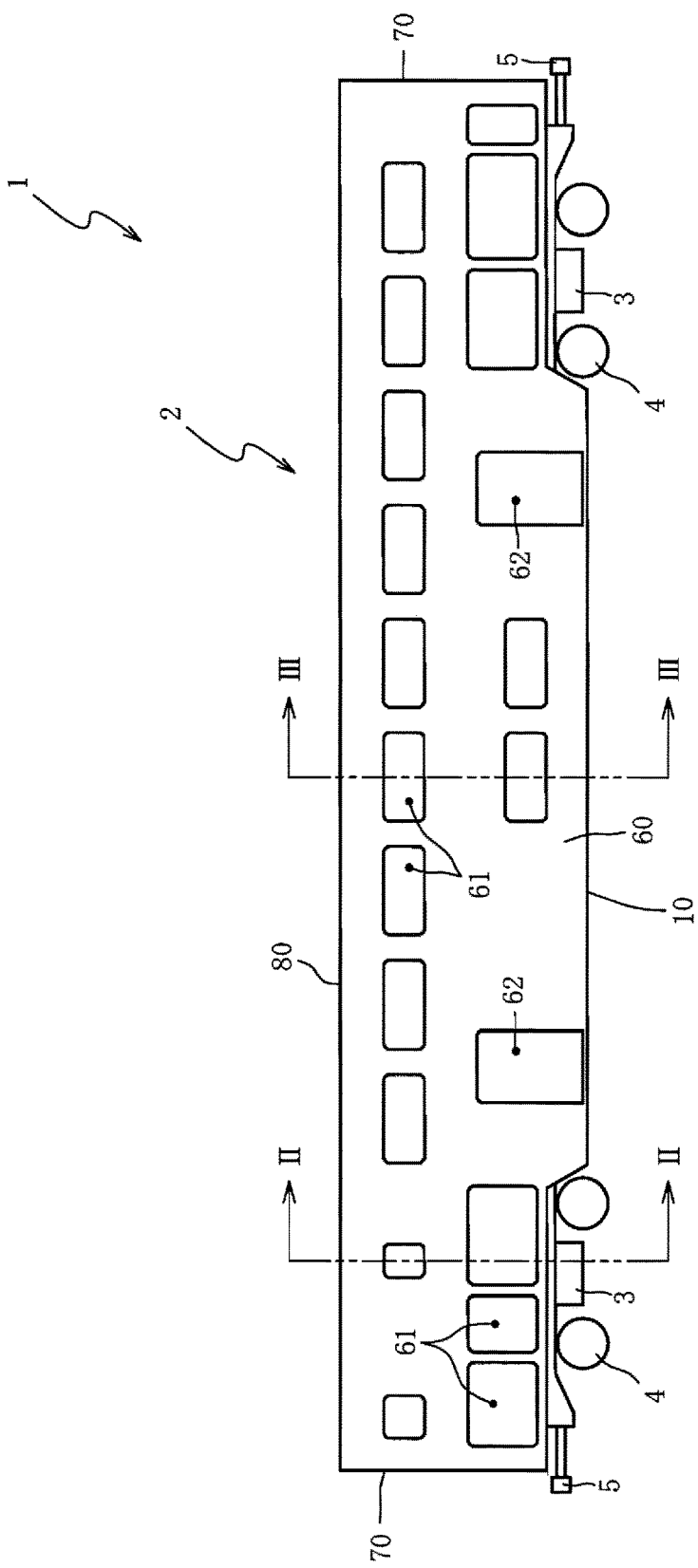
FIG. 1 is a side view of a railcar according to one embodiment of the present invention.
Figure 2:
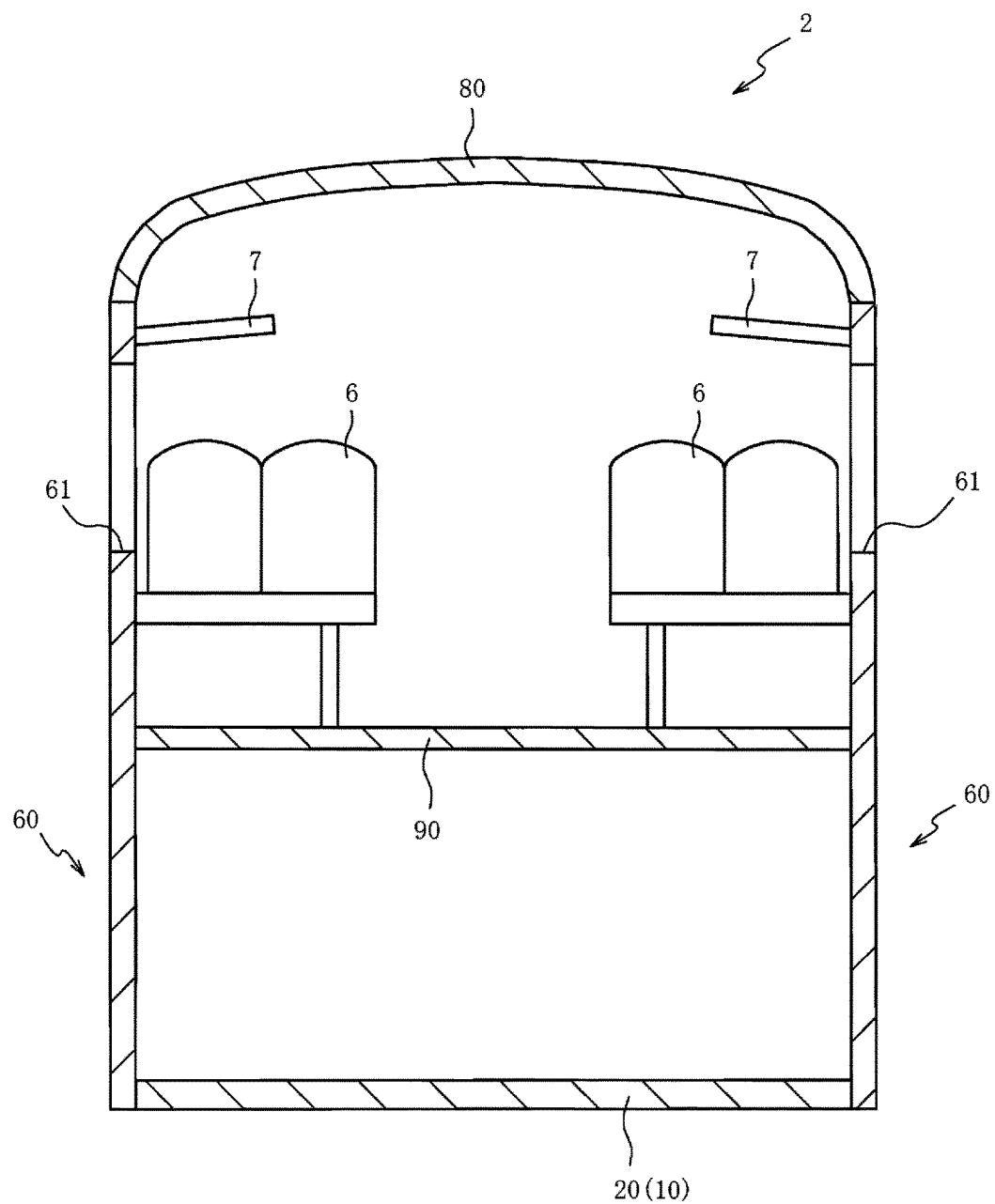
FIG. 2 is a cross-sectional view of the railcar along the line II-II in FIG. 1.
Figure 3:
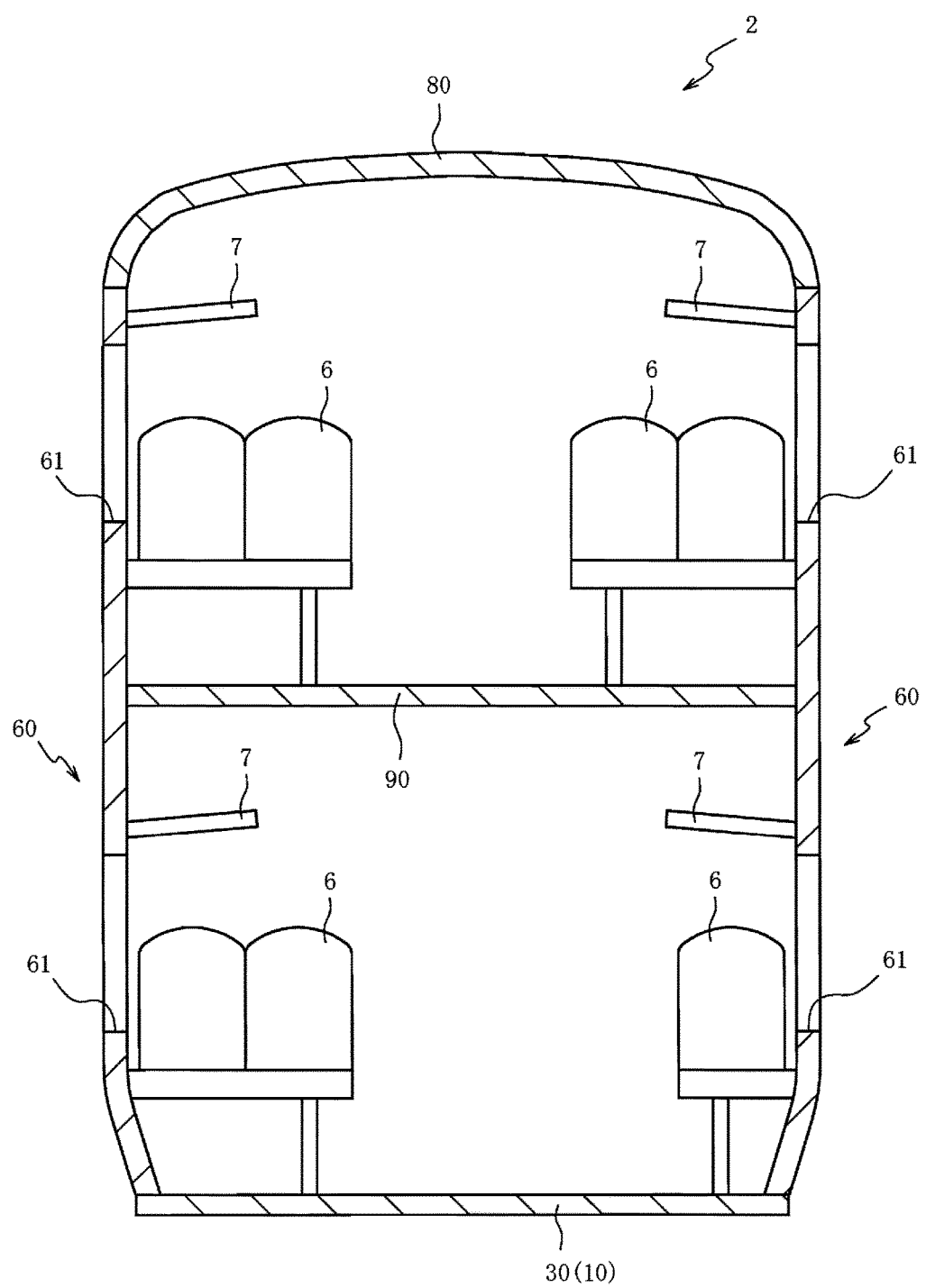
FIG. 3 is a cross-sectional view of the railcar along the line III-III in FIG. 1.

FIG. 1 is a side view of the railcar 1 according to one embodiment of the present invention. FIG. 2 is a cross-sectional view of the railcar 1 along the line II-II in FIG. 1. FIG. 3 is a cross-sectional view of the railcar 1 along the line III-III in FIG. 1.

As illustrated in FIG. 1 to FIG. 3, the railcar 1 mainly includes a carbody 2 internally including a passenger room and an equipment room, bogies 3 that supports this carbody 2 via air suspensions (not illustrated), and wheels 4 journaled to these bogies 3. The railcar 1 is a double-decker having upper and lower two-layer passenger room structures to be formed as a partially-low-floor car where parts of the bogies 3 in a front and a rear are high-floored and a part between the bogies 3 (a central portion in the car longitudinal direction) is low-floored.

The carbody 2 includes an underframe 10 that supports a floor surface of a first floor, side bodyshells 60 whose lower ends are coupled to side portions in a car width direction (a right-left direction in FIG. 2 and FIG. 3) of this underframe 10, end bodyshells 70 whose lower ends are coupled to end portions in a car longitudinal direction (a right-left direction in FIG. 1) of the underframe 10, a roof bodyshell 80 coupled to upper ends of the side bodyshells 60 and the end bodyshells 70, and a second-floor floor member 90 positioned between the underframe 10 and the roof bodyshell 80 to support a floor surface of a second floor.

Connectors 5 are arranged at the end portions in the car longitudinal direction of the underframe 10. The connector 5 projects outside the end bodyshell 70 in the car longitudinal direction. A plurality of seats 6 are disposed side by side at floor surfaces supported by the underframe 10 and the second-floor floor member 90. Baggage racks 7 are disposed to protrude from inner surfaces of the side bodyshells 60 above these plurality of seats 6. A plurality of window openings 61 are each openingly formed at the first floor and the second floor, and a plurality of door openings 62 are each openingly formed at the low-floor parts at the first floor, at the side bodyshells 60.

Figure 4:
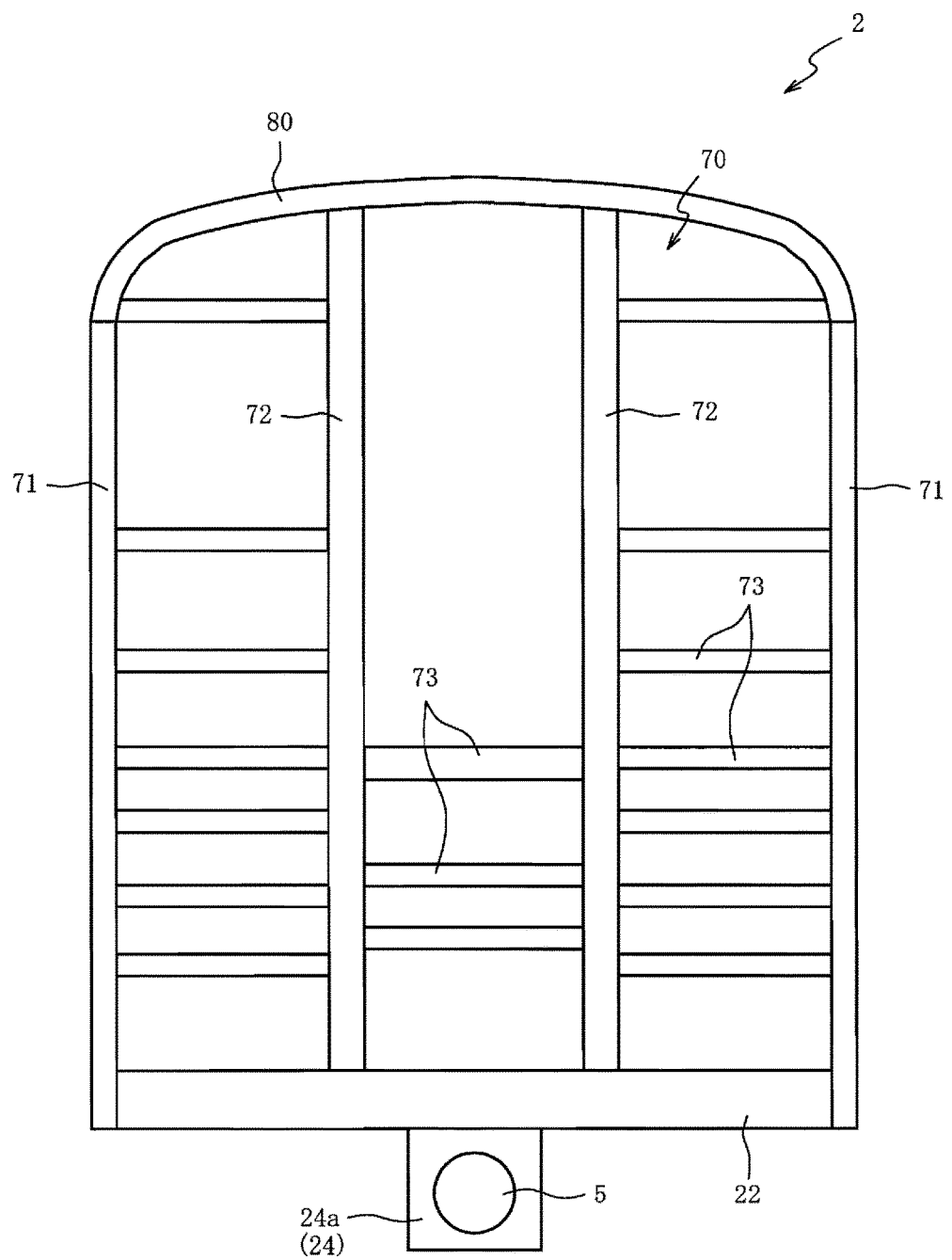
FIG. 4 is a front view of a carbody.

FIG. 4 is a front view of the carbody 2 and illustrates a state that an outer panel is removed to be a frame. As illustrated in FIG. 4, the end bodyshell 70 includes a pair of corner posts 71 disposed to extend in a vertical direction (an up and down direction in FIG. 4) at both end portions in the car width direction, a pair of end posts 72 that have predetermined distances in the car width direction between these pair of corner posts 71 to be disposed to extend in the vertical direction, and reinforced beams 73 that couple the corner post 71 to the end post 72 or the end posts 72 together in the car width direction (a right-left direction in FIG. 4). Lower ends of the corner posts 71 and the end posts 72 are coupled to a first end beam 22 (the underframe 10, see FIG. 5), and upper ends of the corner posts 71 and the end posts 72 are coupled to the roof bodyshell 80, respectively.

Figure 5:
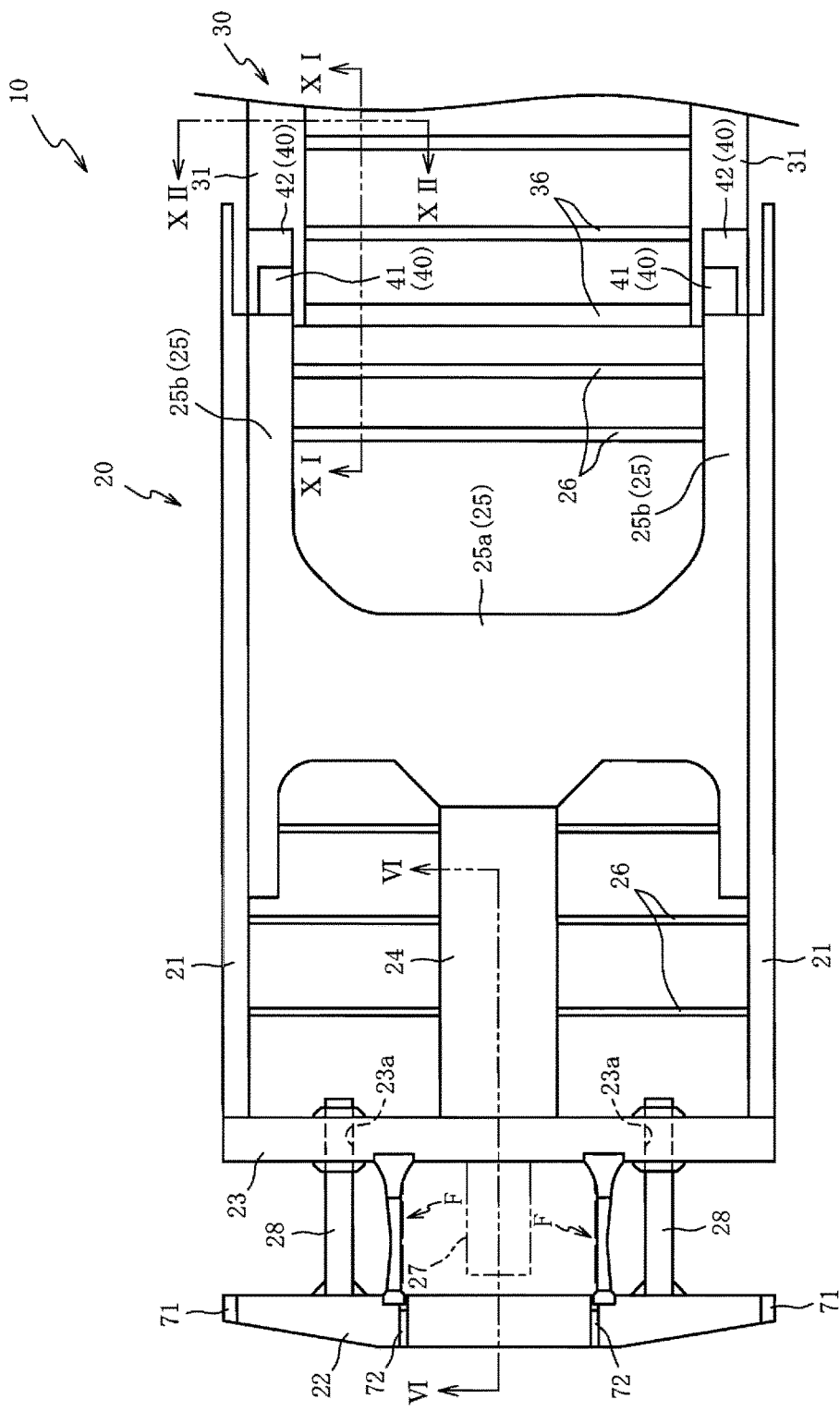
FIG. 5 is a partially enlarged top view of an underframe.
Figure 6:
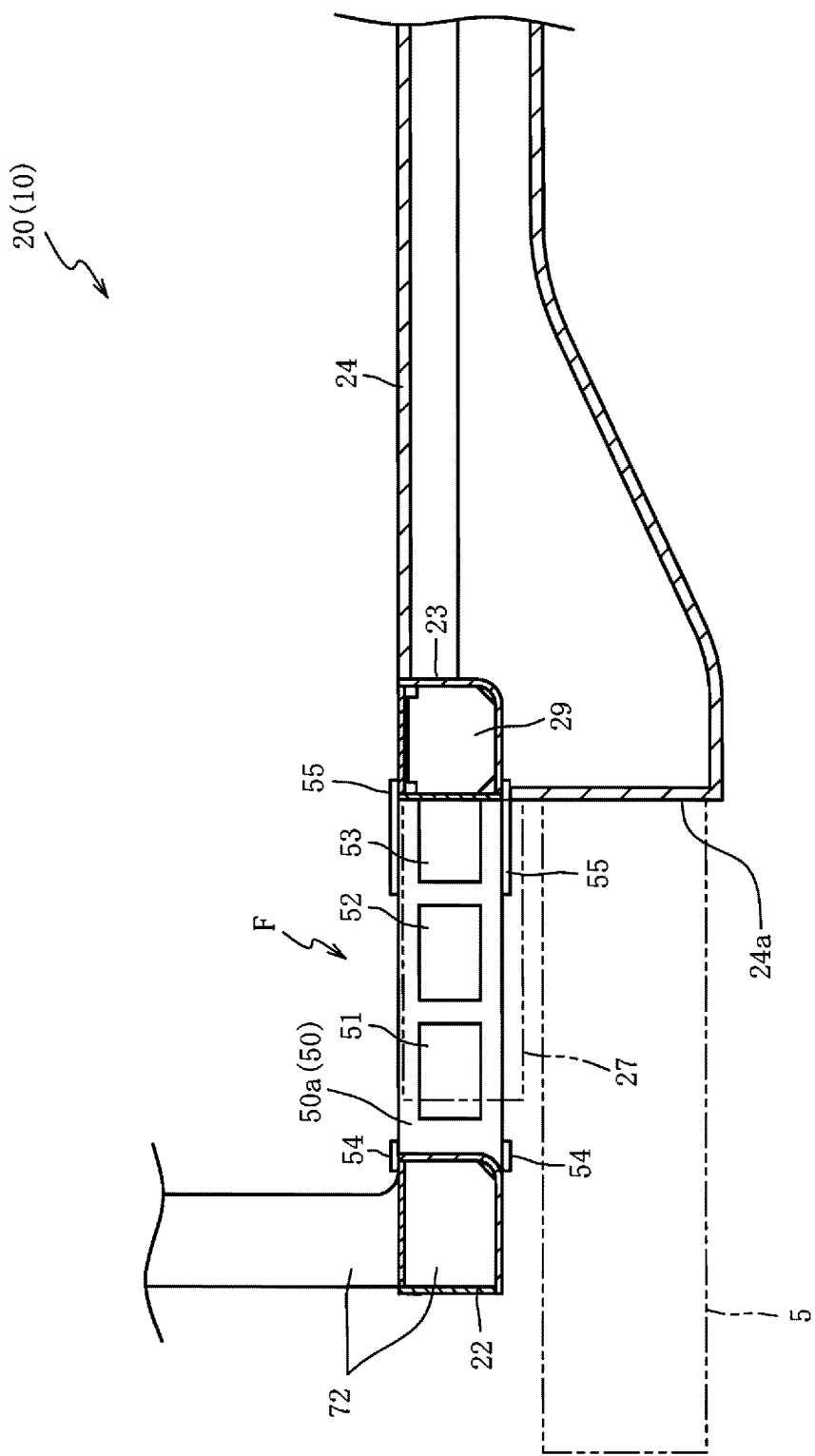
FIG. 6 is a partially enlarged cross-sectional view of the underframe along the line VI-VI in FIG. 5.

Next, a detailed configuration of the underframe 10 will be described with reference to FIG. 5 and FIG. 6. FIG. 5 is a partially enlarged top view of the underframe 10. FIG. 6 is a partially enlarged cross-sectional view of the underframe 10 along the line VI-VI in FIG. 5. FIG. 5 and FIG. 6 schematically illustrate the connector 5 and an energy absorbing member 27 using two-dot chain lines.

As illustrated in FIG. 5 and FIG. 6, the underframe 10 includes a low-floor underframe 30 disposed at a center portion in the car longitudinal direction (a right-left direction in FIG. 5), high-floor underframes 20 arranged at one side and another side in the car longitudinal direction across this low-floor underframe 30 and upper and lower positions are set higher than that of the low-floor underframe 30, and a coupling member 40 that couples this high-floor underframe 20 to this low-floor underframe 30 in a posture that inclines downward from the high-floor underframe 20 toward the low-floor underframe 30 (see FIG. 11), to be symmetrically formed in the car width direction.

The high-floor underframe 20 includes a pair of side beams 21 positioned at both sides in the car width direction (an up and down direction in FIG. 5) to be disposed to extend in the car longitudinal direction, a first end beam 22 positioned at the end portion in the car longitudinal direction to be disposed to extend in the car width direction, a second end beam 23 disposed separated from this first end beam 22 to an inner side (a right side in FIG. 5) in the car longitudinal direction and disposed to extend along the car width direction, a center sill 24 coupled to a center in the car width direction of this second end beam 23, at one end to disposed to extend in the car longitudinal direction, a body bolster 25 coupled to another end of this center sill 24 and installed across the pair of side beams 21 to be supported to the bogie 3 (see FIG. 1), a plurality of floor-receiving beams 26 disposed to extend in the car width direction, the energy absorbing member 27 arranged between the first end beam 22 and the second end beam 23, protruding members 28, and fuse members F.

The first end beam 22 is disposed separating outward in the car longitudinal direction from end portions in the longitudinal direction of the pair of side beams 21. As described above, the lower ends of the pair of corner posts 71 are coupled to both ends in the longitudinal direction of the first end beam 22, and the lower ends of the pair of end posts 72 are coupled between these pair of corner posts 71. The second end beam 23 couples both end portions in the longitudinal direction of the pair of side beams 21 in the car width direction, and is positioned outward the wheels 4 (see FIG. 1) in the car longitudinal direction.

The lower end of the end post 72 is internally inserted from an opening formed at a top surface of the first end beam 22 to be coupled to inner surfaces (two opposing surfaces in the car longitudinal direction and a surface opposed to the opening) of the first end beam 22. A plate-shaped reinforcing plate 29 is arranged inside the second end beam 23 in a state where an outer edge of the reinforcing plate 29 is coupled to inner surfaces (two opposing surfaces in the car longitudinal direction and an lower surface (a lower side in FIG. 6)) of the second end beam 23.

The center sill 24 is formed with curving downward such that the end portion at a side of the second end beam 23 (a left side in FIG. 6) expands a dimension in an up and down direction toward the outside in the car longitudinal direction. An outward end surface in the car longitudinal direction of this end portion is an installation surface 24a on which the connector 5 is installed. In this embodiment, the installation surface 24a of the center sill 24 is formed approximately flush with a surface at an outer side in the car longitudinal direction of the second end beam 23.

The body bolster 25 includes a body bolster center portion 25a to which the other end at an inner side in the car longitudinal direction of the center sill 24 is coupled and disposed to extend in the car width direction, and body bolster extended portions 25b coupled to the pair of side beams 21 and disposed to extend in the car longitudinal direction to be positioned at both sides in the car width direction of the body bolster center portion 25a. The body bolster 25 is formed to be approximately H-shaped from a top view by these body bolster center portion 25*a* and body bolster extended portions 25*b*.

The energy absorbing member 27 is a member for absorbing an energy transmitted from the first end beam 22 to the second end beam 23 such that, when the first end beam 22 moves toward the second end beam 23 in consequence of the collision, the energy absorbing member 27 is compressed to be deformed between these first end beam 22 and second end beam 23. A base end of the energy absorbing member 27 is coupled to the center in the car width direction of the second end beam 23 in a state having a predetermined distance from the first end beam 22. As the energy absorbing member 27, a known configuration is employable, thus omitting its detailed description.

Here, the center sill 24 is coupled to a surface at the inner side (the right side in FIG. 5) in the car longitudinal direction at approximately a center in the car width direction of the second end beam 23. The energy absorbing member 27 is coupled to a surface at an opposite side of this surface (the surface at the outer side in the car longitudinal direction at the center in the car width direction of the second end beam 23). Accordingly, the first end beam 22 is moved toward the second end beam 23 in collision. When the energy absorbing member 27 is compressed, the center sill 24 supports the second end beam 23 from behind to ensure surely deforming (compressing) the energy absorbing member 27, and the second end beam 23 deforms inward in the car longitudinal direction to ensure reducing influence to the passenger room.

The energy absorbing member 27 has the predetermined distance from the first end beam 22. Thus, by this distance, at an early stage in the collision, this facilitates to transmit the load input to the first end beam 22 only to the fuse members F. Accordingly, this can restrain the energy absorbing member 27 from being a resistance against buckling of the fuse member F. That is, when inputting the intended load, the fuse member F can be surely buckled.

The protruding member 28 is a member for guiding a moving direction of the first end beam 22 to be disposed to protrude from a surface at an inner side in the car longitudinal direction of the first end beam 22 toward the second end beam 23 along the car longitudinal direction. The second end beam 23 includes a slide holding portion 23*a* that is an opening penetrated along the car longitudinal direction. This slide holding portion 23*a* receives a protruding distal end of the protruding member 28 (a distal end of the protruding member 28 is inserted into the slide holding portion 23*a*). Thus, the protruding member 28 is held to the slide holding portion 23*a* slidably along the car longitudinal direction. That is, this can regulate the moving direction toward the second end beam 23, of the first end beam 22, to the car longitudinal direction, in the collision.

Here, the protruding member 28 is formed of a steel pipe with a rectangular cross-section (steel material with a closed cross-sectional structure). The slide holding portion 23*a* is formed as the opening having an inner shape identical to or slightly larger than an outer shape of the protruding member 28. Forming the protruding member 28 with the steel pipe can endure bend and torsion, compared with a case formed of an open cross-sectional or solid member having an identical weight. Accordingly, this ensures coupling strength between the first end beam 22 and the second end beam 23 to ensure improvement of rigidity at a car end portion (an end portion in the car longitudinal direction).

As described above, the slide holding portion 23*a* is formed as the opening penetrated along the car longitudinal direction at the second end beam 23. Thus, when the first end beam 22 is moved toward the second end beam 23, the slide holding portion 23*a* can receive the protruding member 28 using a space at a back side (the inner side in the car longitudinal direction) of the second end beam 23. That is, effect that guides the first end beam 22 along the car longitudinal direction (slide displacement of the protruding member 28 with respect to the slide holding portion 23*a*) can be maintained until just before the first end beam 22 abuts on the second end beam 23.

Forming the slide holding portion 23*a* as the opening of the second end beam 23 improves space efficiency to not only ensure a passenger room space, but also ensure rigidity of the slide holding portion 23*a*, compared with a case where a different member arranged at a top surface or a lower surface of the second end beam 23 slidably holds the protruding member 28. Accordingly, the slide holding portion 23*a* can strongly hold the protruding member 28, and to that extent, the coupling strength between the first end beam 22 and the second end beam 23 is ensured to ensure the improvement of the rigidity of the car end portion (the end portion in the car longitudinal direction).

The fuse member F functions as a strength member that ensures the rigidity of the car end portion (the coupling part between the first end beam 22 and the second end beam 23) in normal operation. On the other hand, the fuse member F is a member for allowing the first end beam 22 to move toward the second end beam 23, by buckling when the load received in the collision exceeds a predetermined value. The fuse member F couples the first end beam 22 to the second end beam 23 along the car longitudinal direction.

When the first end beam 22 collides with an oncoming car, the underframe 10 compresses the fuse members F in the longitudinal direction between the first end beam 22 and the second end beam 23. When the load exceeds the predetermined value, the underframe 10 buckles this fuse member F to allow the first end beam 22 to move toward the second end beam 23.

That is, in a structure of a conventional product that breaks a plurality of coupling members such as rivets and bolts to allow the first end beam 22 to move toward the second end beam 23, influence of a dimensional tolerance and a position tolerance of each of holes and the coupling members gathers to facilitate to generate variation at breaking strength. Thus, when the intended load is input, it has been difficult to allow the first end beam 22 to move toward the second end beam 23. However, as this embodiment, the structure that uses the buckling of the fuse member F ensures reducing variation of the load that allows the first end beam 22 to move toward the second end beam 23. Consequently, when the intended load is input, the first end beam 22 is allowed to move toward the second end beam 23.

A pair of sets (slide mechanisms) including the protruding members 28 and the slide holding portions 23*a* are arranged. These pair of slide mechanisms are symmetrically disposed in the car width direction (in the up and down direction in FIG. 5) across the energy absorbing member 27. This can straightly guide (move along the car longitudinal direction) the first end beam 22 toward the second end beam 23, for example, even when the oncoming car collides being biased in the car width direction to input an unbalanced load to the first end beam 22. Consequently, the fuse member F can be buckled by the intended load, and the energy absorbing member 27 can be stably compressed along the car longitudinal direction.

Similarly, a pair of fuse members F are arranged. These pair of fuse members F are symmetrically disposed in the car width direction (the up and down direction in FIG. 5) across the energy absorbing member 27. This can uniform the load required for the deformation in the buckling and after the buckling of the fuse member F, in the car width direction. That is, a posture with respect to the second end beam 23, of the first end beam 22 inclines to ensure restraining the protruding member 28 from getting complicated inside the slide holding portion 23a. Consequently, the slide displacement of the protruding member 28 with respect to the slide holding portion 23a can be smoothly performed.

In this case, in this embodiment, the slide mechanism (the set of the protruding member 28 and the slide holding portion 23a) is disposed outside the fuse member F in the car width direction (the upper side or the lower side in FIG. 5). This facilitates to straightly guide (move along the car longitudinal direction) the first end beam 22 toward the second end beam 23, for example, even when the oncoming car collides being biased in the car width direction to input the unbalanced load to the first end beam 22. Consequently, this facilitates to buckle the fuse member F by the intended load, and facilitates to stably compress the energy absorbing member 27 along the car longitudinal direction.

Figure 7:
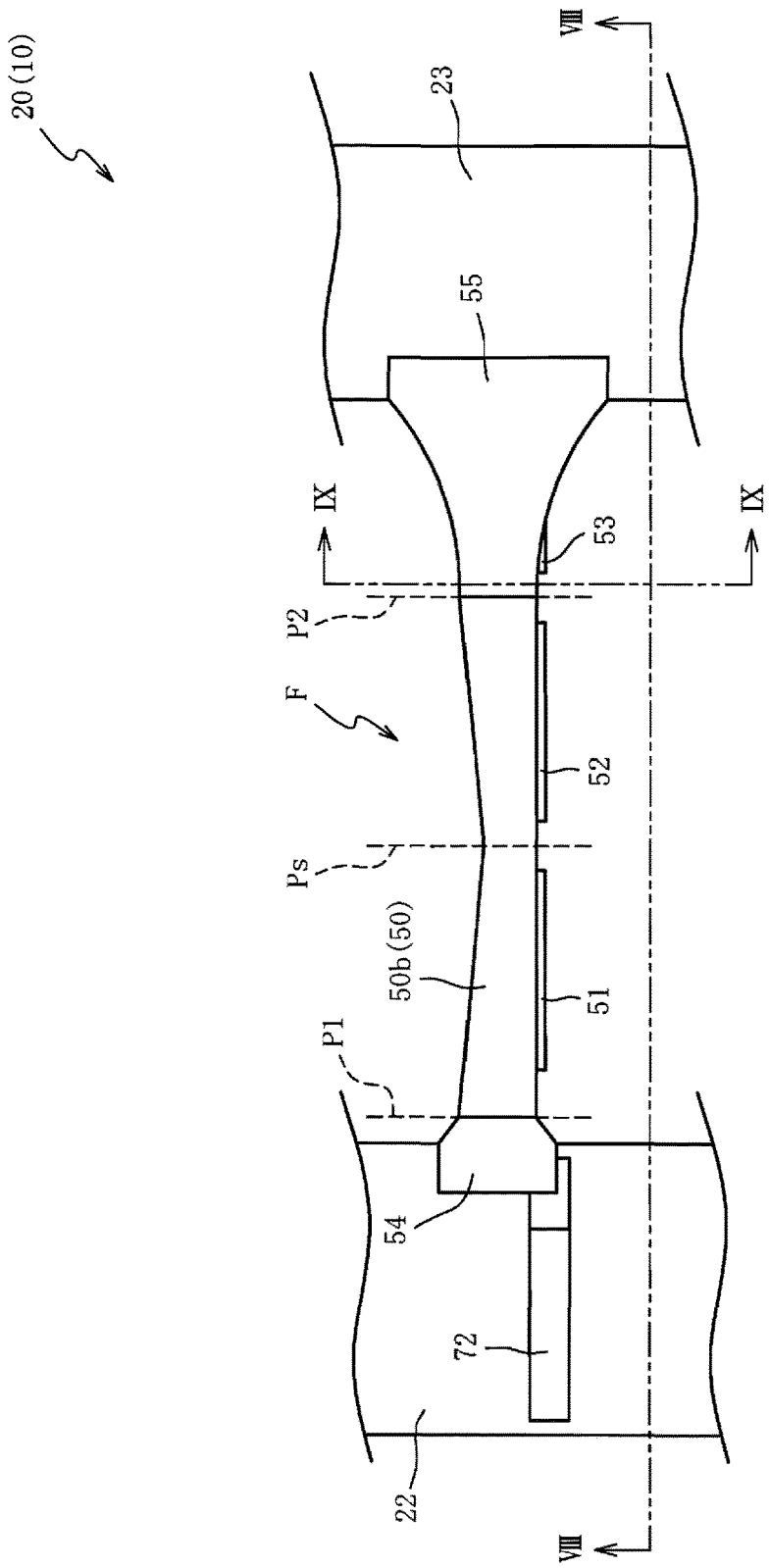
FIG. 7 is a partially enlarged top view of the underframe.
Figure 8:
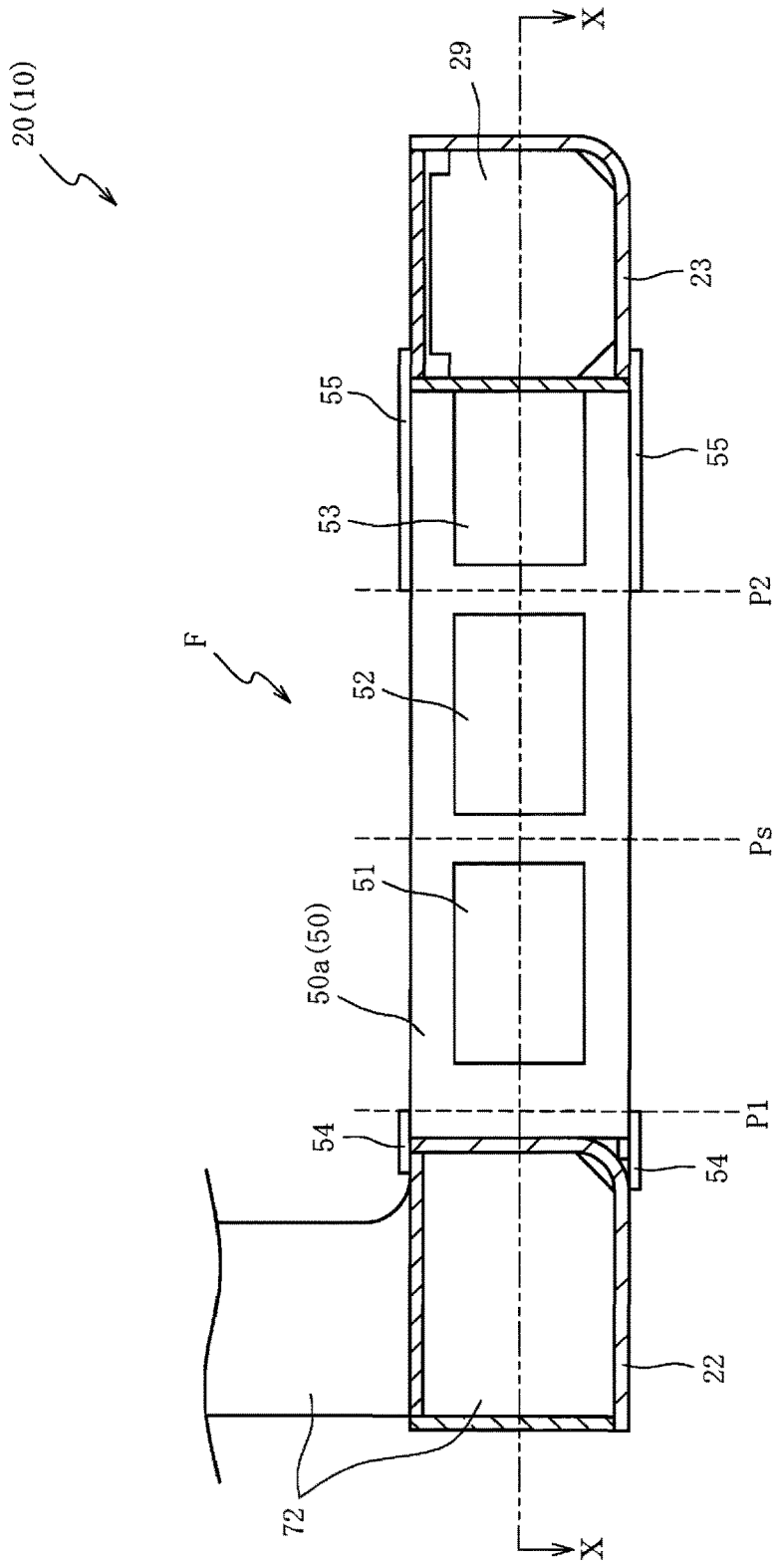
FIG. 8 is a partially enlarged cross-sectional view of the underframe along the line VIII-VIII in FIG. 7.
Figure 9:
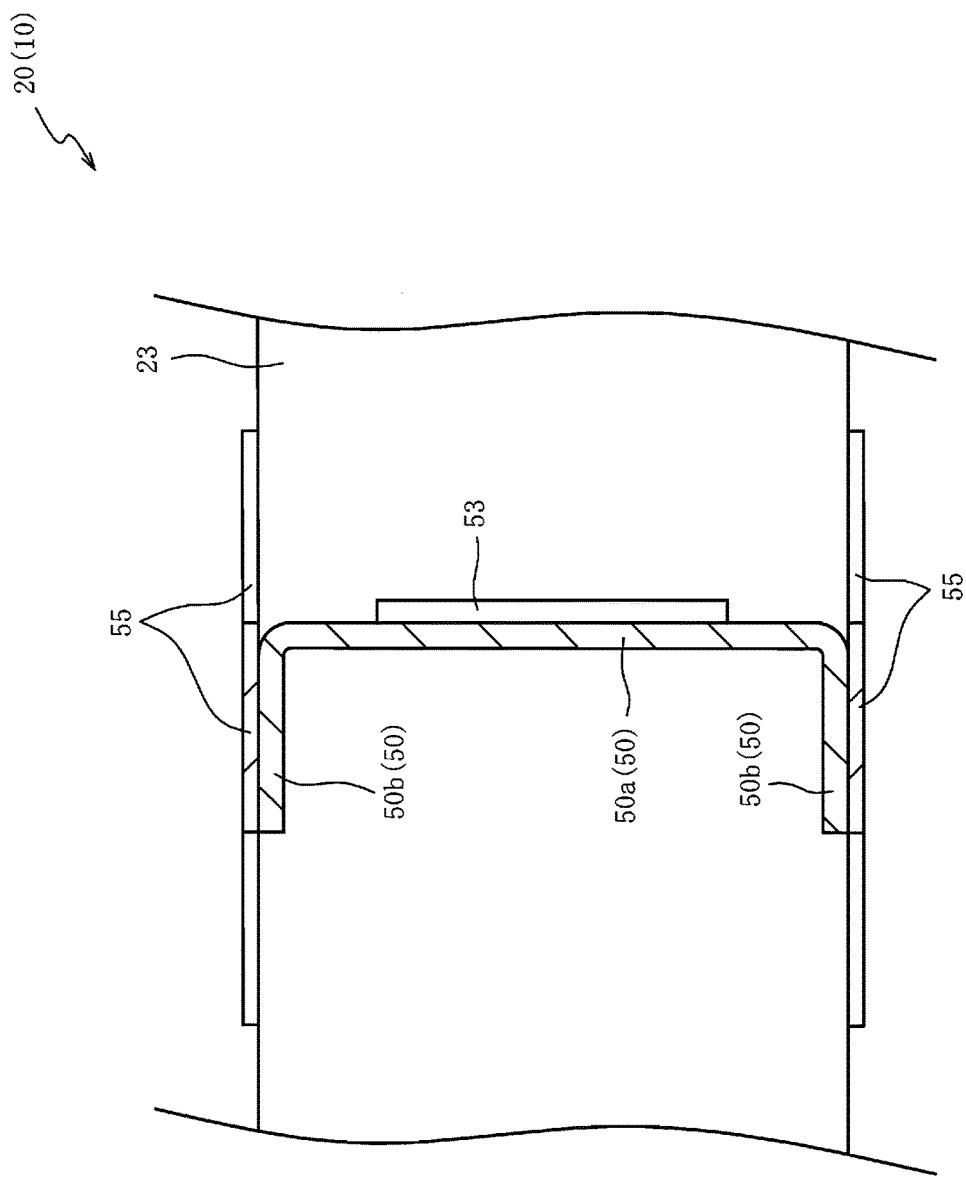
FIG. 9 is a partially enlarged cross-sectional view of the underframe along the line IX-IX in FIG. 7.
Figure 10:
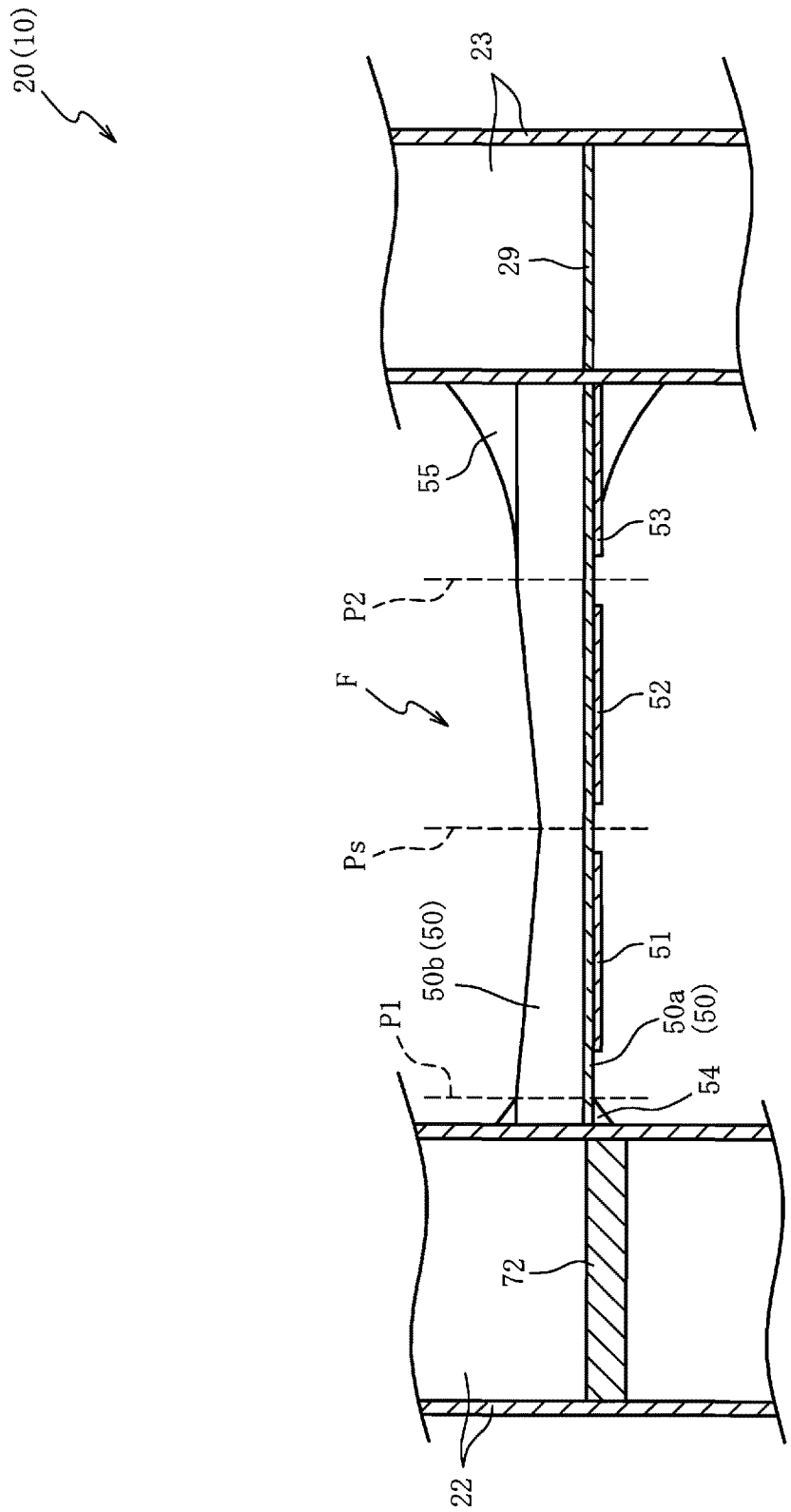
FIG. 10 is a partially enlarged cross-sectional view of the underframe along the line X-X in FIG. 8.

Next, a detailed configuration of the fuse member F will be described with reference to FIG. 7 to FIG. 10. FIG. 7 is a partially enlarged top view of the underframe 10. FIG. 8 is a partially enlarged cross-sectional view of the underframe 10 along the line VIII-VIII in FIG. 7. FIG. 9 is a partially enlarged cross-sectional view of the underframe 10 along the line IX-IX in FIG. 7. FIG. 10 is a partially enlarged cross-sectional view of the underframe 10 along the line X-X in FIG. 8.

As illustrated in FIG. 7 to FIG. 10, the fuse member F includes a channel material 50 that couples the first end beam 22 to the second end beam 23, three plate-shaped bodies (a first plate member 51, a second plate member 52, and a third plate member 53) fixedly secured to this channel material 50 at regular intervals along the longitudinal direction, a first gusset plate 54 installed across the first end beam 22 and the channel material 50, and a second gusset plate 55 installed across the second end beam 23 and the channel material 50.

The channel material 50, which is a member forming a frame of the fuse member F, is formed into an approximately U-shaped cross-section, including a web 50a disposed to extend along the car longitudinal direction (a right-left direction in FIG. 7) and a pair of flanges 50b disposed upright from both end portions (edge portions) of this web 50a. End surfaces in the longitudinal direction of the web 50a and end surfaces in the longitudinal direction of the flange 50b are coupled to each of the first end beam 22 and the second end beam 23, in a posture that the web 50a is parallel to the vertical direction (the flange 50b is parallel to a horizontal direction).

In this way, the fuse member F is formed of the channel material 50 with the approximately U-shaped cross-section. Thus, the fuse member F ensures the coupling strength between the first end beam 22 and the second end beam 23 to ensure the improvement of the rigidity of the car end portion in normal operation. On the other hand, when receiving the load that exceeds the predetermined value in consequence of the collision, the fuse member F promptly buckles to allow the first end beam 22 to move toward the second end beam 23.

In this embodiment, the fuse member F is arranged in a posture that an opening side (a side at which the flange 50b is disposed upright) of the channel material 50 is opposed to an outside in the car width direction (a side of the protruding member 28) (see FIG. 5). As described later, the fuse member F can buckle in a mode that a back side (a lower side in FIG. 7) of the web 50a is folded outside (an uprightly-disposed side (an upper side in FIG. 7) of the flange 50b is an inside), with a reference position Ps as a base point. That is, the channel material 50 can be folded to be doglegged to a direction separated from the protruding member 28.

Accordingly, as described above, turning the opening side to the protruding member 28 can reduce interference of the folded channel material 50 to the protruding member 28 to ensure disposing the fuse member F close to the protruding member 28. This facilitates to obtain a guide effect in a sliding direction by the slide mechanism (the protruding member 28 and the slide holding portion 23a) to ensure stably forming the buckling of the fuse member F.

A thickness dimension of the channel material 50 (a dimension between outer surfaces of the pair of flanges 50b, and dimensions in up and down directions in FIG. 8 and FIG. 9) is configured approximately identical to thickness dimensions of the first end beam 22 and the second end beam 23.

The first gusset plate 54 and the second gusset plate 55 are each including upper and lower two plates. The top surface and a lower surface of the first end beam 22 are bonded on the outer surfaces of the respective flanges 50b of the channel material 50 by the first gusset plate 54, and the top surface and the lower surface of the second end beam 23 are bonded on the outer surfaces of the respective flanges 50b of the channel material 50 by the second gusset plate 55, respectively.

This can restrain a base end side (a coupling part to the first end beam 22 or the second end beam 23) of the channel material 50 from buckling on ahead, when the load in consequence of the collision acts. That is, the buckling in a mode that the channel material 50 is folded at an approximately central part in the longitudinal direction (a region between the first gusset plate 54 and the second gusset plate 55) can be surely formed. Consequently, the fuse member F (the channel material 50) is facilitated to buckle into an intended shape.

Here, at the fuse member F, a low-rigidity portion whose rigidity is partially low is formed at the reference position Ps between the first gusset plate 54 and the second gusset plate 55. With this reference position Ps (the low-rigidity portion) as the base point, the fuse member F is configured to buckle in the intended shape. The low-rigidity portion is formed by lowering an uprightly-disposed height of the flange 50b and thinning a plate thickness of the web 50a. This low-rigidity portion will be described in the following.

At the fuse member F, the low-rigidity portion is formed at the reference position Ps such that the height disposed upright from the web 50a (a dimension in an up and down direction in FIG. 7) of the flange 50b is partially lowered. This can generate the buckling in the mode that the web 50a can be folded, with the reference position Ps (the low-rigidity portion) as the base point, when the load in consequence of the collision acts, to facilitate to buckle the fuse member F into the intended shape.

In particular, in this embodiment, at the channel material 50, the height disposed upright from the web 50a of the flange 50b is continuously lowered toward the reference position Ps, in the region between the first gusset plate 54 and the second gusset plate 55 (see FIG. 7). That is, an outer edge of the flange 50b is formed to be approximately V-shaped. This can cause the load acted in consequence of the collision to stably focus on the reference position Ps to ensure surely generating the buckling in the mode that the back side (the lower side in FIG. 7) of the web 50a is folded outside (the uprightly-disposed side (the upper side in FIG. 7) of the flange 50b is the inside) at the reference position Ps (the low-rigidity portion).

At the fuse member F, the low-rigidity portion is also formed at the reference position Ps by thinning the plate thickness of the web 50a. This can cause the load acted in consequence of the collision to further focus on the reference position Ps to ensure more surely generating the buckling in the mode that the back side (the lower side in FIG. 7) of the web 50a is folded outside (the uprightly-disposed side (the upper side in FIG. 7) of the flange 50b is the inside) at the reference position Ps (the low-rigidity portion).

In this case, in this embodiment, fixedly securing the plate-shaped bodies (the first plate member 51, the second plate member 52, and the third plate member 53) to the back surface (a surface at a side opposed to an uprightly-disposed direction of the flange 50b) of the web 50a varies the plate thickness of the web 50a. Specifically, fixedly securing the first plate member 51 and the second plate member 52 having a predetermined distance partially thins the plate thickness such that the plate-shaped body is not secured at the reference position Ps. This can reduce man-hours to ensure reduction of a product cost to that extent, for example, compared with a case of performing a cutting work to partially thin the plate thickness of the web 50a.

The first plate member 51, the second plate member 52, and the third plate member 53 are formed into horizontally long rectangular shapes in front view. Accordingly, fixedly securing these respective plate members 51 to 53 in postures that these longitudinal directions are set along the longitudinal direction of the channel material 50 (the web 50a) can easily form thin parts (parts at which the plate thickness is thinned) disposed to extend with an equal width in a direction (the up and down direction in FIG. 8) perpendicular to the longitudinal direction of the web 50a.

Here, it is also considered that an opening is disposed at the web 50a to form the low-rigidity portion at the reference position Ps. However, when the opening forms the low-rigidity portion at the reference position Ps, it cannot be regulated that the web 50a is folded to which direction at the reference position Ps (the low-rigidity portion) to make this folded direction instable. In contrast, the structure that fixedly secures the plate-shaped bodies to the back surface of the web 50a to form the low-rigidity portion at the reference position Ps can stably regulate the direction that the web 50a is folded. That is, this ensures surely generating the buckling in the mode that the back side (the lower side in FIG. 7) of the web 50a is folded outside (the uprightly-disposed side (the upper side in FIG. 7) of the flange 50b is the inside) at the reference position Ps (the low-rigidity portion).

The first plate member 51, the second plate member 52, and the third plate member 53, as described above, are disposed at regular intervals one another along the longitudinal direction of the web 50a (a distance between the first plate member 51 and the second plate member 52, and a distance between the second plate member 52 and the third plate member 53 are set to be identical).

In contrast, a group including the respective plate members 51 to 53 is disposed being biased to a side of the second end beam 23 (a right side in FIG. 8), in the longitudinal direction of the web 50a. Therefore, a distance larger than the distances between the plate members 51 to 53 is formed between the first end beam 22 and the first plate member 51. On the other hand, a clearance is not formed between the third plate member 53 and the second end beam 23 (that is, an edge portion of the third plate member 53 is fixedly secured (coupled) to the second end beam 23).

This enhances coupling strength at a coupling part between the fuse member F and the second end beam 23 to ensure restraining this coupling part from being folded. Accordingly, this facilitates to buckle the fuse member F into the intended shape.

That is, the connector 5 is arranged at a bottom surface side of the second end beam 23, and this connector 5 is projected outside the first end beam 22 in the car longitudinal direction (see FIG. 6). Therefore, the oncoming car may collide with the connector 5 on ahead, and in this case, the carbody 2 is deformed in a form that turns the end bodyshell 70 (the first end beam 22) downward (lowers a head) by the load input from the connector 5. Thus, large bending moment acts on the coupling part to the second end beam 23, at the fuse member F.

Accordingly, the edge portion of the third plate member 53 is fixedly secured to the surface at the outer side (a left side in FIG. 8) in the car longitudinal direction of the second end beam 23 to enhance the coupling strength at the coupling part between the fuse member F and the second end beam 23, thus ensuring resistance against the above-described bending moment to ensure restraining the fuse member F from being folded at the coupling part to the second end beam 23.

The group including the respective plate members 51 to 53 is disposed being biased to the second end beam 23 side (the right side in FIG. 8) in the longitudinal direction of the web 50a to ensure forming change of the plate thickness of the web 50a at a first position P1 and a second position P2, which are described later, and increasing a size of the second gusset plate 55. That is, this increasing of the size of the second gusset plate 55 will be also effective for resisting against the above-described bending moment to restrain the fuse member F from being folded at the coupling part to the second end beam 23.

At the web 50a of the channel material 50, fixedly securing the first plate member 51, the second plate member 52, and the third plate member 53 to the back surface thins the plate thicknesses at three positions: the reference position Ps, the first position P1 at a first end beam 22 side of this reference position Ps, and the second position P2 at the second end beam 23 side of the reference position Ps.

Accordingly, when the load in the collision acts, while folding the fuse member F in the form that the back side (the lower side in FIG. 7) of the web 50a is outside (the uprightly-disposed side (the upper side in FIG. 7) of the flange 50b is the inside), as described above, at the reference position Ps, in contrast, the buckling in the mode that the back side of the web 50a is folded inside (the uprightly-disposed side of the flange 50b is the outside) can be generated at the first position P1 and the second position P2. This ensures reduction of the load required for the deformation of the fuse member F after this fuse member F buckles.

In particular, in this embodiment, an edge portion of the first gusset plate 54 is positioned at the first position P1, and an edge portion of the second gusset plate 55 is positioned at the second position P2. Thus, at one or both of the first position P1 and the second position P2, when the web 50a is folded in the above-described form, the flange 50b constrained by the first gusset plate 54 or the second gusset plate 55 can be cut along the edge portion of the first gusset plate 54 or the second gusset plate 55. Accordingly, after the fuse member F buckles, the load required for the deformation of this fuse member F can be further reduced.

As described above, the lower end of the end post 72 is coupled to the inner surface of the first end beam 22, and the plate-shaped reinforcing plate 29 is arranged inside the second end beam 23, in a state where the outer edge of the reinforcing plate 29 is coupled to the inner surface of the second end beam 23.

In this case, the end post 72 and the reinforcing plate 29 are disposed in a straight line along the car longitudinal direction (see FIG. 10). These end post 72 and reinforcing plate 29, and the fuse member F are disposed at positions that positions in the car width direction (an up and down direction in FIG. 10) at least partially overlap. That is, as viewed in the car longitudinal direction (viewed in a right-left direction in FIG. 10), the end post 72 and the reinforcing plate 29, and the fuse member F at least partially overlap. In this embodiment, the end post 72 and the reinforcing plate 29, and the web 50*a* of the channel material 50 are disposed in a straight line along the car longitudinal direction.

When the oncoming car collides with the end bodyshell 70 (see FIG. 4), that is, even when the oncoming car collides with a focus on a position higher than the first end beam 22, this facilitates to transmit the load in the collision to the fuse member F (the web 50*a* of the channel material 50) via the end posts 72. Consequently, the fuse member F is buckled to ensure absorption of the energy by the energy absorbing member 27.

Regardless of whether the oncoming car collides at the position higher than the first end beam 22 or directly collides with the first end beam 22, the reinforcing plate 29 can support the fuse member F (the web 50*a* of the channel material 50) that has received the load from a rearward to ensure surely buckling the fuse member F (the channel material 50).

The description will be given returning to FIG. 5 and FIG. 6. The low-floor underframe 30 includes a pair of side beams 31 positioned at both sides in the car width direction (the up and down direction in FIG. 5) to be disposed to extend in the car longitudinal direction, and a plurality of floor-receiving beams 36 disposed to extend in the car width direction. As described above, the railcar 1 is formed as the partially-low-floor car, and the underframe 10 is formed as an underframe structure where the low-floor underframe 30 is coupled to the high-floor underframe 20 whose upper and lower positions are set higher than that of this low-floor underframe 30 by the coupling member 40. This underframe structure will be described with reference to FIG. 11 to FIG. 13.

Figure 11:
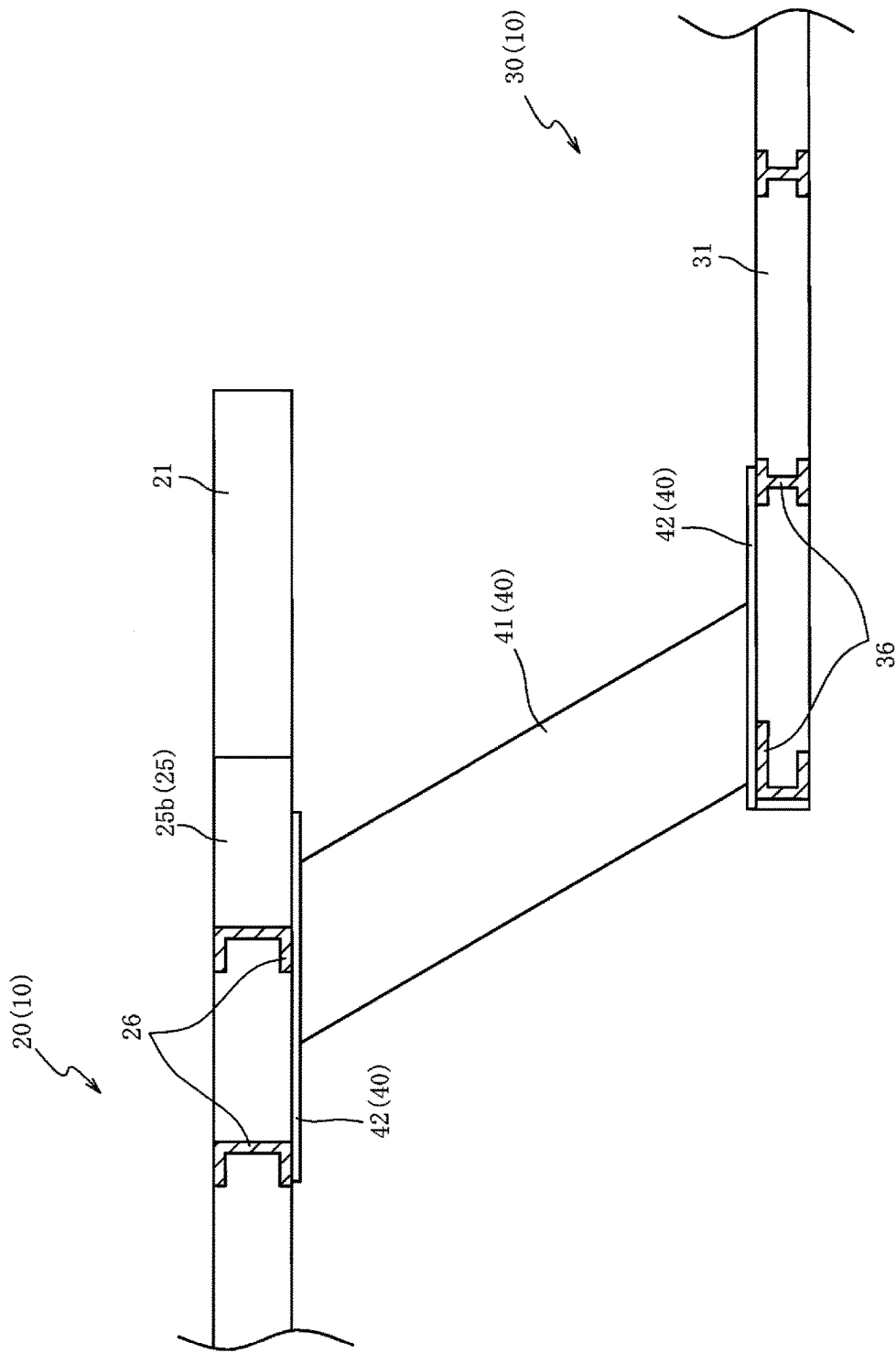
FIG. 11 is a partially enlarged cross-sectional view of the underframe along the line XI-XI in FIG. 5.
Figure 12:
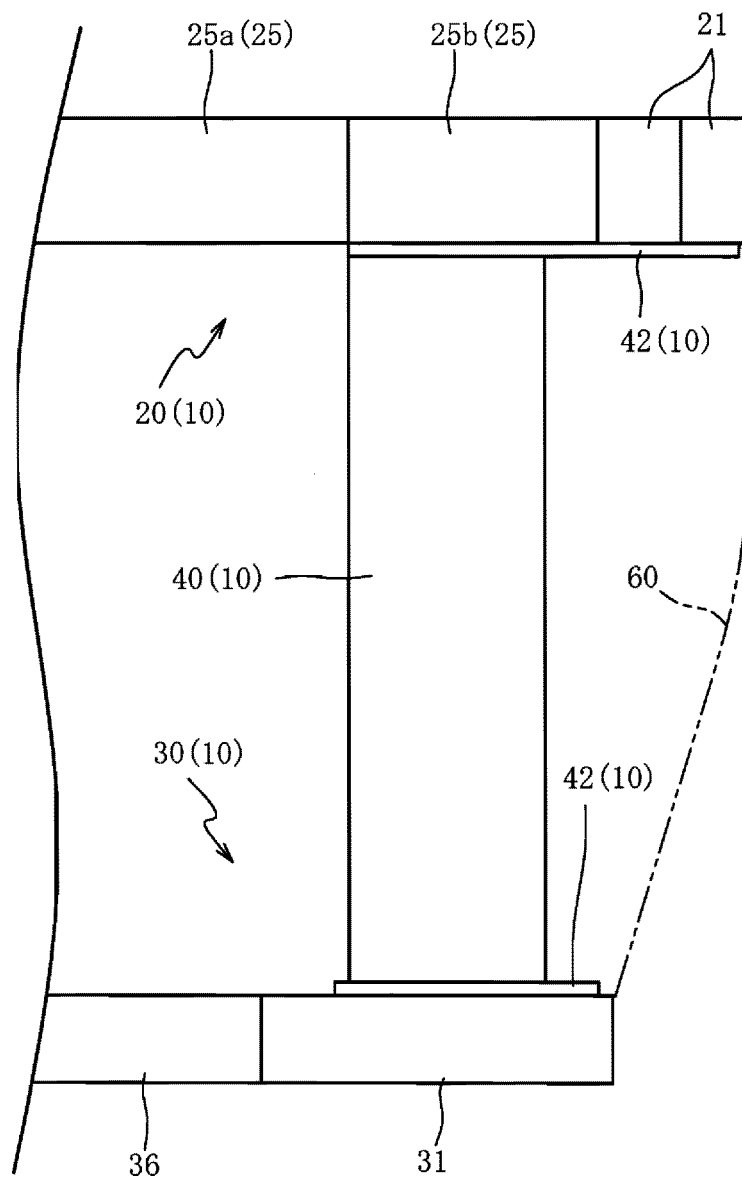
FIG. 12 is a partially enlarged cross-sectional view of the underframe along the line XII-XII in FIG. 5.
Figure 13:
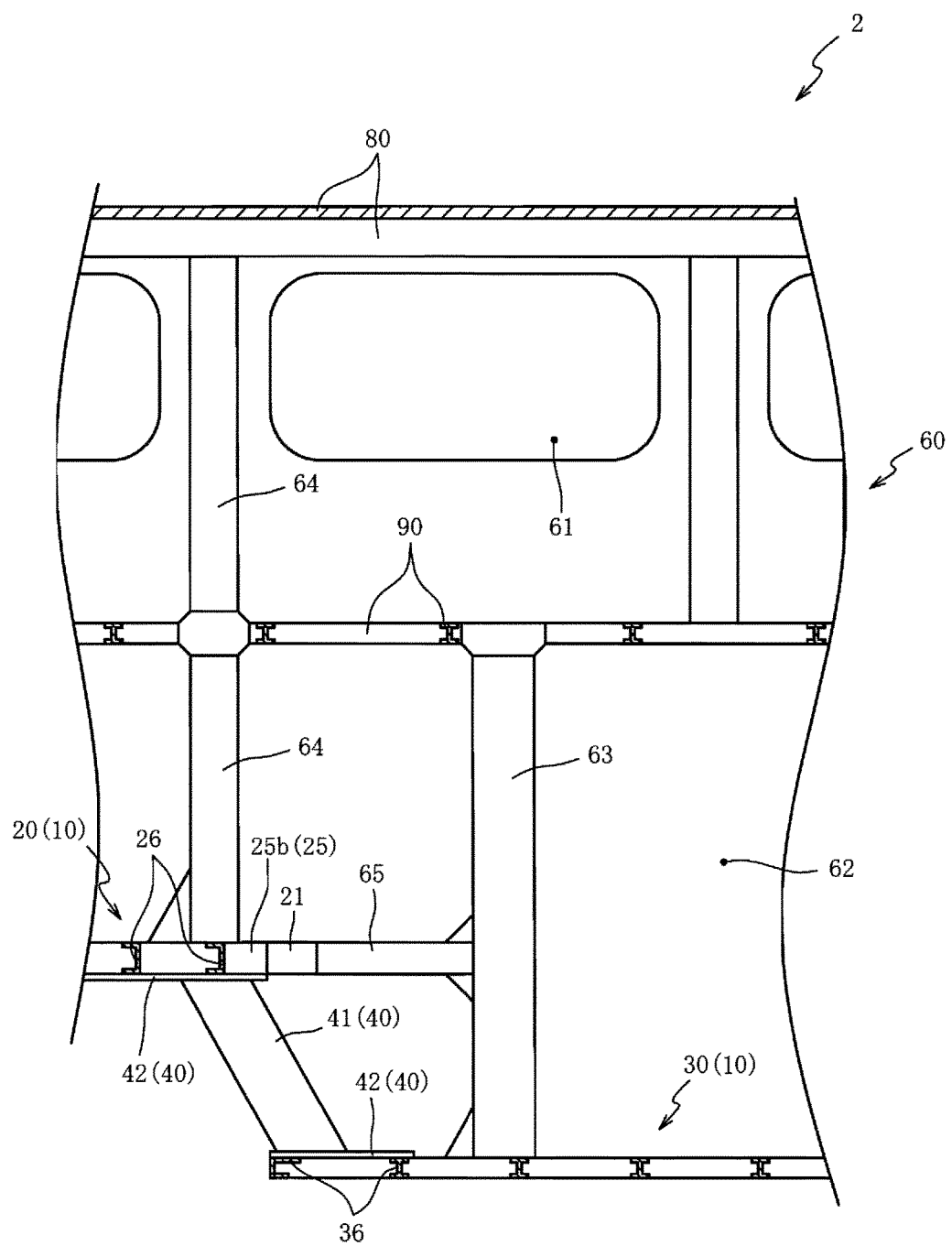
FIG. 13 is a partially enlarged cross-sectional view of the carbody.

FIG. 11 is a partially enlarged cross-sectional view of the underframe 10 along the line XI-XI in FIG. 5. FIG. 12 is a partially enlarged cross-sectional view of the underframe 10 along the line XII-XII in FIG. 5. FIG. 13 is a partially enlarged cross-sectional view of the carbody 2, and corresponds to a cross-section along the line XI-XI in FIG. 5. FIG. 13 illustrates only a main configuration by simplifying the drawing for easily understanding.

As illustrated in FIG. 11 to FIG. 13, the coupling member 40 includes a main body member 41 formed of a steel pipe with the rectangular cross-section (steel material with the closed cross-sectional structure), and upper and lower pair of flange members 42 formed by projecting out from outer surfaces at both end portions in the longitudinal direction of this main body member 41, to couple a lower surface of the body bolster extended portion 25*b* at the body bolster 25 of the high-floor underframe 20 to a top surface of the side beam 31 of the low-floor underframe 30.

The upper and lower pair of flange members 42 are formed as plate-shaped bodies with rectangular shapes in front view that are parallel one another. The upper side flange member 42 is formed having a size (a width dimensions, and a right-left directional dimension in FIG. 12) coupled to the lower surface of the body bolster 25 (the body bolster extended portion 25*b*) and a lower surface of the side beam 21, at the high-floor underframe 20.

As described above, the high-floor underframe 20 includes the center sill 24 coupled to the center in the car width direction of the second end beam 23 at the one end to disposed to extend in the car longitudinal direction, and the body bolster 25 coupled to the other end of this center sill 24 (see FIG. 5), and the side bodyshell 60 is coupled to the side beam 31 of the low-floor underframe 30. Accordingly, when a car end compression load is input to the high-floor underframe 20, this car end compression load can be directly transmitted from the center sill 24 and the body bolster 25 of the high-floor underframe 20 to the side beam 31 of the low-floor underframe 30 via the coupling member 40. This can disperse the car end compression load on the side bodyshell 60 to ensure car strength against the car end compression load.

A first side post 63 coupled to the side beam 31 of the low-floor underframe 30 at a lower end and disposed to extend in the up and down direction (an up and down direction in FIG. 13), and a first frame member 65 that couples this first side post 63 to the side beam 21 of the high-floor underframe 20 and is disposed to extend in the car longitudinal direction (a right-left direction in FIG. 13) are arranged at the side bodyshell 60.

Accordingly, when the car end compression load is input to the high-floor underframe 20, this car end compression load can be transmitted from the side beam 21 of the high-floor underframe 20 to the first side post 63 via the first frame member 65. That is, a route that transmits the car end compression load to the side bodyshell 60 can be further ensured separately from the route by the coupling member 40. This facilitates to disperse the car end compression load on the side bodyshell 60 to ensure the car strength against the car end compression load.

In this case, the first side post 63 of the side bodyshell 60 is coupled to the second-floor floor member 90, at an upper end. Accordingly, when the car end compression load is input to the high-floor underframe 20, this car end compression load also can be transmitted to the second-floor floor member 90 via the first side post 63. This can disperse the car end compression load on the second-floor floor member 90, in addition to the side bodyshell 60, to ensure the car strength against the car end compression load.

A second side post 64 coupled to the side beam 21 of the high-floor underframe 20 at a lower end and disposed to extend in the up and down direction (the up and down direction in FIG. 13) is arranged at the side bodyshell 60. This second side post 64 is coupled to the second-floor floor member 90, in the middle of the longitudinal direction. Accordingly, when the car end compression load is input to the high-floor underframe 20, this car end compression load can be transmitted from the side beam 21 of this high-floor underframe 20 to the side bodyshell 60 and the second-floor floor member 90 via the second side post 64. This can disperse the car end compression load on the side bodyshell 60 and the second-floor floor member 90 to ensure the car strength against the car end compression load.

In this case, the lower end of the second side post 64 of the side bodyshell 60 is coupled to the side beam 21 of the high-floor underframe 20 at a position approximately corresponding to a position at which the coupling member 40 (the main body member 41 and the flange member 42) is coupled to the body bolster 25 of the high-floor underframe 20 in the car longitudinal direction (the right-left direction in FIG. 13). Thus, the car end compression load input to the high-floor underframe 20 to be transmitted from the center sill 24 and the body bolster 25 of this high-floor underframe 20 can be efficiently transmitted to the second side post 64 via the body bolster 25 and the side beam 21. This facilitates to disperse the car end compression load on the side bodyshell 60 to ensure the car strength against the car end compression load.

Further, the second side post 64 is coupled to the roof bodyshell 80 at an upper end. Accordingly, when the car end compression load is input to the high-floor underframe 20, this car end compression load also can be transmitted from the side beam 21 of this high-floor underframe 20 to the roof bodyshell 80 via the second side post 64. This also can disperse the car end compression load on the roof bodyshell 80, in addition to the side bodyshell 60 and the second-floor floor member 90, to ensure the car strength against the car end compression load.

Here, similar to the main body member 41 of the coupling member 40, the first side post 63, the second side post 64, and the first frame member 65 are formed of steel pipes with the rectangular cross-sections (steel material with the closed cross-sectional structure). Accordingly, when receiving the car end compression load, buckling of these respective members (the main body member 41, the first side post 63, the second side post 64, and the first frame member 65) can be restrained. Consequently, the car strength against the car end compression load is ensured.

Between the first side post 63 and the second side post 64, an intermediate post and a plurality of reinforcing beams are arranged (any of them is not illustrated). The intermediate post is disposed to extend in the up and down direction (the up and down direction in FIG. 13) to couple the second-floor floor member 90 to the first frame member 65. The reinforcing beams are disposed to extend in the car longitudinal direction (the right-left direction in FIG. 13) to couple the first side post 63 to the intermediate post and the intermediate post to the second side post 64.

On a surface at a car room side of the first side post 63, the second side post 64, and the intermediate post (a side opposed to the outer panel, and a near side in a paper of FIG. 13), a shear plate is stretched (fixedly secured). The shear plate, which is a plate-shaped body with an approximately rectangular shape in front view, in this embodiment, is arranged in a form installed across the first side post 63 and the intermediate post, and across the intermediate post and the second side post 64. This ensures the car strength against the car end compression load.

As described above, the present invention has been described based on the above-mentioned embodiment. It will be appreciated that the present invention will not be limited to the embodiment described above, but various modifications are possible without departing from the technical scope of the present invention.

While in the above-described embodiment, a case where the outer shape of the protruding member 28 is formed into the rectangular cross-section has been described, this should not necessarily be construed in a limiting sense. The outer shape may be formed into a circular-shaped cross-section. While a case where the protruding member 28 is hollow has been described, this should not necessarily be construed in a limiting sense. The protruding member 28 may be solid.

While in the above-described embodiment, as a method that varies the plate thickness of the web 50*a* (partially forms portions whose plate thicknesses are thin), a case where the plurality of plate-shaped bodies (the first plate member 51, the second plate member 52, and the third plate member 53) are fixedly secured to the web 50*a* has been described, this should not necessarily be construed in a limiting sense. For example, performing a cutting work to the web 50*a* may partially thin the plate thickness of the web 50*a*. The method that fixedly secures the plate-shaped bodies and the method that performs the cutting work may be combined.

The invention claimed is:

1. A railcar comprising:
   an underframe that includes a first end beam disposed at an end portion in a car longitudinal direction and disposed to extend along a car width direction and a second end beam disposed separated from the first end beam to a car inner side and disposed to extend along the car width direction;
   an energy absorbing member that is arranged between the first end beam and the second end beam and absorbs an energy input from the first end beam and transmitted to the second end beam in collision;
   a protruding member disposed to protrude along the car longitudinal direction from the first end beam toward the second end beam;
   a slide holding portion that slidably holds the protruding member along the car longitudinal direction and is formed at the second end beam; and
   a fuse member that couples the first end beam to the second end beam along the car longitudinal direction and buckles to allow the first end beam to move toward the second end beam when a load received in the collision exceeds a predetermined value, wherein:
   a first end of the fuse member is coupled to the first end beam and a second end of the fuse member is coupled to the second end beam, and
   a first end of the energy absorbing member is spaced a predetermined distance from the first end beam, and a second end of the energy absorbing member is coupled to the second end beam at a surface at a car outer side at a center in the car width direction of the second end beam.

2. The railcar according to claim 1, wherein:
   the underframe includes a center sill coupled to a surface at the car inner side at approximately the center in the car width direction of the second end beam to be disposed to extend along the car longitudinal direction.

3. The railcar according to claim 2, comprising
   a pair of sets including the protruding member and the slide holding portion, wherein
   the pair of sets are symmetrically disposed in the car width direction across the energy absorbing member.

4. The railcar according to claim 3, comprising
   a pair of the fuse members, wherein
   the pair of fuse members are symmetrically disposed in the car width direction across the energy absorbing member.

5. The railcar according to claim 4, wherein
   the set of the protruding member and the slide holding portion is disposed outside the fuse member in the car width direction.

6. The railcar according to claim 4, comprising
   a pair of end posts disposed upright from the first end beam to be coupled to a roof bodyshell, wherein
   each of the pair of fuse members is disposed at a position where at least a part of a position in the car width direction of each of the pair of fuse members overlaps each of the pair of end posts.

7. The railcar according to claim 1, wherein
the slide holding portion is penetrated through the second end beam along the car longitudinal direction to be formed as an opening into which the protruding member is inserted.

8. The railcar according to claim 5, comprising
a pair of end posts disposed upright from the first end beam to be coupled to a roof bodyshell, wherein
each of the pair of fuse members is disposed at a position where at least a part of a position in the car width direction of each of the pair of fuse members overlaps each of the pair of end posts.

9. The railcar according to claim 2, wherein
the slide holding portion is penetrated through the second end beam along the car longitudinal direction to be formed as an opening into which the protruding member is inserted.

10. The railcar according to claim 3, wherein
the slide holding portion is penetrated through the second end beam along the car longitudinal direction to be formed as an opening into which the protruding member is inserted.

11. The railcar according to claim 4, wherein
the slide holding portion is penetrated through the second end beam along the car longitudinal direction to be formed as an opening into which the protruding member is inserted.

12. The railcar according to claim 5, wherein
the slide holding portion is penetrated through the second end beam along the car longitudinal direction to be formed as an opening into which the protruding member is inserted.

13. The railcar according to claim 6, wherein
the slide holding portion is penetrated through the second end beam along the car longitudinal direction to be formed as an opening into which the protruding member is inserted.

14. The railcar according to claim 8, wherein
the slide holding portion is penetrated through the second end beam along the car longitudinal direction to be formed as an opening into which the protruding member is inserted.

\* \* \* \* \*